United States Patent Office 3,421,928
Patented Jan. 14, 1969

3,421,928
**MAR-RESISTANT PLASTIC SHEET AND
PROCESS FOR PRODUCING SAME**
Wallace Burton Ramsey, Stamford, and Darwin Fiske
De Lapp, New Canaan, Conn., assignors to American
Cyanamid Company, Stamford, Conn., a corporation of
Maine
No Drawing. Filed Sept. 27, 1965, Ser. No. 490,720
U.S. Cl. 117—76                        11 Claims
Int. Cl. B44d 5/00; B44d 1/16

ABSTRACT OF THE DISCLOSURE

This invention relates to a method for the production of a plastic body having a mar-resistant surface which comprises coating said plastic body with a solution of a vinyl butyral polymer, evaporating off the solvent and coating the thus treated body with a substantially linear, water-insoluble, non-gelled, unsaturated polyester resin composition. Still more particularly, this invention relates to a plastic body having a mar-resistant surface which is bonded to the body by means of a binding agent comprising a polymer of vinyl butyral.

One of the objects of the present invention is to produce a plastic body composed of a mar-resistant surface securely bonded to a plastic substrate or base member.

A further object of the present invention is to secure a mar-resistant surface to a plastic substrate or base by coating the base with a vinyl butyral polymer solution, evaporating off the solvent and coating the resultant object with a polyester resin composition, whereby the surface of the substrate after treatment is significantly more mar-resistant than before treatment.

A further object of the present invention is to provide a plastic body having a mar-resistant surface which is bonded to the body by means of a binding agent comprising a polymer of vinyl butyral. These and other objects of the present invention will become more apparent to one skilled in the art upon reading the more detailed description set forth hereinbelow.

Many plastic bodies, particularly those prepared from thermoplastic materials, have a tendency to be receptive to abrasion and, as a consequence, have a low resistance to marring. Illustrative of these plastic bodies are objects made from poly(methyl methacrylate), poly(styrene), poly(carbonates), poly(vinyl chloride), poly(vinyl acetate) and the like. In order to retain the otherwise outstanding physical and chemical characteristics of these objects, it is generally necessary to protect one or more of the surfaces thereof with a coating of a resinous material which is capable of being cross-linked to a thermoset condition and which displays, in said thermoset condition, a hard-durable, mar-resistant surface.

In the application of coating compositions, such as those more specifically recited hereinbelow, we have found that the bonding of the coating to the plastic base can be significantly enhanced by coating the surface of said plastic base, to which the mar-resistant finish is to be applied, with a thin layer of a vinyl butyral polymer.

We have found that by coating the surface of the polymer base with from about a 1%–5%, preferably a 2%–4%, solution of a vinyl butyral polymer for at least about 2 minutes, and then evaporating of the solvent by heating, we can prepare the polymer base for contact with the mar-resistant layer.

Utilizing this procedure, we have found that the mar-resistant coating added thereafter is more securely bonded to the polymer base than if the vinyl butyral polymer treatment is omitted or various other known prior art techniques are used.

The vinyl butyral polymers used in the process described herein are generally well known in the art. As used herein, the term "vinyl butyral polymer" or "polymer of vinyl butyral" is meant to include poly(vinyl butyral) per se or polymers containing vinyl butyral linkages amounting to at least 50% of the polymer chain. That is to say, in the production of vinyl butyral polymers, the starting material is poly(vinyl acetate) or poly(vinyl alcohol). If poly(vinyl acetate) is used, it is first hydrolyzed to an alcohol and the resultant polymer is then reacted with an aldehyde (butyraldehyde) to produce the polymer of vinyl butyral. If poly(vinyl alcohol) is used, only the aldehyde reaction is carried out. Depending upon the degree of hydrolysis and the amount of aldehyde used, the resultant polymer may contain all butyral units or it may contain some unhydrolyzed acetate groups and/or some unreacted alcohol groups. As a result, these polymers are either vinyl butyral homopolymers or copolymers or terpolymers of vinyl butyral and vinyl alcohol and/or vinyl acetate. Use of polymers of this type is within the scope of the instant invention. These polymers of vinyl butyral and methods for their production are more fully described in one or more of the following U.S. Patents Nos. 2,282,026 and 2,400,957, which patents are hereby incorporated herein by reference.

The vinyl butyral polymer should be utilized as a solution in any known solvent therefor with such materials as ethanol, toluene, n-butanol, benzene, methylene chloride, tetrayhdrofuran, dimethyl sulfoxide, mixtures thereof and the like being exemplary. In fact, we have found that a mixture of ethanol, toluene and n-butanol is preferred in that optically clear products result when this mixture is used. The use of other solvents may tend to result in somewhat hazy or cloudy coatings.

Any known unsaturated polyester resin may be used as the surface coating in our novel process, i.e. those produced by reacting an unsaturated polycarboxylic acid with a saturated or unsaturated polyhydric alcohol under conditions known to those skilled in the art.

A preferred coating used as the mar-resistant surface on the plastic bodies in the practice of the process of the present invention, is broadly, a substantially linear, water-insoluble, non-gelled unsaturated polyester resin composition comprising a blend of (1) the esterification reaction product of reactants consisting essentially of fumaric acid and a polyethylene or polypropylene glycol wherein said glycol has between 6 and 39 carbon atoms, and said product has an acid number below about 35 and (2) a glycol diacrylate which is the reaction product of a glycol selected from the group consisting of polyglycols having from 4 to 8 carbon atoms and monoglycols containing from 2 to 4 carbon atoms, inclusive, and an acid selected from the group consisting of acrylic acid and methacrylic acid, wherein (2) is present in an amount varying between about 10% and 40%, by weight, based on the total weight of (1) and (2).

In order to eliminate any tendency for said coating to develop a haze, especially over a wide temperature range, the aforementioned linear, polyester resin composition may be further modified by adding thereto about 1% and 5%, by weight, of a polymerizable styrene, said percentages by weight being based on the total weight of the glycol fumarate, the glycol diacrylate and the styrene monomer. A more specific disclosure of such compositions is set forth in copending application, Ser. No. 390,197, filed Aug. 17, 1964, in the names of Deichert and Christensen, now U.S. Patent No. 3,265,763.

More specifically, the surfacing material preferably used to impart the mar-resistant characteristic to the plastic base in the process of the present invention is more completely set forth in at least one of copending applications Ser. No. 307,812, filed Sept. 10, 1963, in the names of Deichert and Webb, now U.S. Patent No. 3,264,372 and Ser. No. 474,142, filed July 22, 1955, in the names of De Lapp and Deichert. In the aforesaid applications, there are set forth disclosures of substantially linear, water-insoluble, non-gelled unsaturated polyester resin compositions which may be used as the surfacing components in the present invention. These earlier polyester resin compositions impart to the substrates to which they are applied, markedly improved mar-resistant properties in those instances when the substrate has a deficiency in mar-resistance. When the plastic substrate is coated with the polyester resin composition used in the present invention without pretreatment with the vinyl butyral polymer, the bonding of the polyester resin film to the substrate is less secure and has a poorer degree of bond, as measured by the Scotch tape grid test, than a comparable plastic base which has been treated with vinyl butyral polymer according to the instant process.

Generally, these substanially linear, water-insoluble, non-gelled, unsaturated polyester resin compositions comprise a blend of two principal components, namely certain fumaric acid/glycol polyester resins and certain glycol diacrylates.

The fumaric acid/glycol polyester component is, as mentioned above, the esterification reaction product produced by reacting components consisting essentially of fumaric acid and a polyethylene or polypropylene glycol.

Among the polyethylene glycols which may be used to esterify the fumaric acid are triethylene glycol, tetraethylene glycol, pentaethylene glycol, hexaethylene glycol, heptaethylene glycol, octaethylene glycol, dodecaethylene glycol, tridecaethylene.

Among the polypropylene glycols which may be used to esterify the fumaric acid are dipropylene glycol, tripropylene glycol, tetrapropylene glycol, pentapropylene glycol, hexapropylene glycol, heptapropylene glycol, octapropylene glycol, nonapropylene glycol, decapropylene glycol, undecapropylene glycol, dodecapropylene glycol, tridecapropylene glycol and the like.

The preferred polypropylene glycols, preferred in that they impart a higher degree of weatherability to the resultant compositions than the other polypropylene glycols, are the secondary isomers of the above specified polypropylene glycols. These secondary isomers possess at least one terminal hydroxyl group on a secondary carbon atom.

Examples of isomeric compounds we may use in the practice of our invention include the secondary isomer of dipropylene glycol and the (secondary, secondary) isomer of dipropylene glycol. Similarly, the secondary and (secondary, secondary) isomers of all of the above specified polypropylene glycols may be used herein.

The ployethylene glycols and the polypropylene glycols may be used singly or as mixtures with themselves or one another and still be within the scope of the present invention.

In the preparation of these polyester resin compositions, the fumaric acid and the polyethylene or polypropylene glycol may be used in substantially equimolar proportions, since each is, for the purposes of esterification, difunctional. For preferred processing results, however, an excess, amounting to about 5 to 20%, of the polyethylene or polypropylene glycol should be used over and beyond that amount stoichiometrically calculated to esterify substantially all of the carboxyl groups in the fumaric acid.

The second component used in the above-mentioned surfacing compositions, namely the glycol diacrylate, is prepared by esterifying the acrylic acid or methacrylic acid with a polyglycol or monoglycol. Among the polyglycols which may be used to produce the glycol diacrylates are diethylene glycol, triethylene glycol, tetraethylene glycol, dipropylene glycol, bis(4-hydroxybutyl ether) and the like. Among the monoglycols which may be used to esterify the acrylic acids are ethylene glycol, propylene glycol, the propanediols-1,2 and 1,3; the butanediols-1,2; 1,3; and 1,4 and the like. These glycol diacrylates can be used with the glycolfumarates either singly or in combination with one another. However, whether used singly or in combination, the glycol diacrylate should be present in the total composition in the amounts specified above.

An additional mar-resistant coating which may be utilized in our novel process includes those composed of (A) the esterification reaction product of triethylene glycol and fumaric acid, (B) ethyl acrylate, (C) allyl methacrylate and (D) triallyl cyanurate. This composition is the subject of copending application, Ser. No. 454,714, filed May 10, 1965, in the names of Bristol, Sherr and Deichert now U.S. Patent No. 3,294,867, and contains between 60%, by weight, and 90%, by weight, based on the total composition of component (A) and from about 40%, by weight, to about 10%, by weight, of the other different copolymerizable monomers (B), (C) and (D). Trace amounts, i.e. up to 5%, of other acids such as phthalic acid, adipic acid, succinic acid, etc. and/or other alcohols such as 2-ethyl-1,3-hexanediol, neopentyl glycol, etc., may also be tolerated.

A further example of the suitable mar-resistant coating useful herein is set forth in copending application, Ser. No. 459,464, filed May 27, 1965, in the names of Deichert and Bristol now U.S. Patent No. 3,318,975. This composition is composed of (a) the esterification reaction product of triethylene glycol and fumaric acid, (b) allyl methacrylate and (c) certain glycol diacrylates, i.e. those disclosed more fully hereinabove. The same trace amounts of acids and alcohols as specified immediately above may also be tolerated in this composition.

In a further modification, a suitable mar-resistant coating which may be used herein is composed of (I) the esterification reaction product of fumaric acid, triethylene glycol and 2-ethyl-1,3-hexanediol, (II) a polymerizable styrene and (III) certain glycol diacrylates. Component (III) is more fully discussed hereinabove in regard to other useful mar-resistant coatings. Examples of polymerizable styrenes, useful in this composition and also that mentioned hereinabove, include styrene per se side chain and ring-substituted halo and/or alkyl styrenes such as α-chlorostyrene, α-methylstyrene, o-, m-, and p-methyl styrenes, o-, m-, and p-chlorostyrenes, 2,4-dimethyl styrene, 2,5-dimethylstyrene, 2,3-dichlorostyrene, 2,4-dibromostyrene and the like. The use of the substituted styrenes is to be avoided, however, when a clear, water-white composition is desired. This composition is more fully set forth in copending application, Ser. No. 398,053, filed Sept. 21, 1964, in the names of Deichert, Christensen and Ramsey, now U.S. Patent No. 3,265,764, which application and all those mentioned hereinabove are hereby incorporated herein by reference.

The substantially linear, water-insoluble, nongelled unsaturated polyester resin compositions, once coated on the plastic substrate, may be converted from the ungelled or thermosetting state to the hard, thermoset state by the application of heat and/or pressure with or without catalysis. Still further, thermosetting material can be converted to the thermoset state by use of catalysts or initiators without restoring to either heat or pressure. The catalytic materials or polymerization initiators which may be used to make such a conversion in state are well-known in the art and have been used extensively for this purpose. Illustrative catalysts are the peroxide catalysts such as, benzoyl peroxide, tertiary butyl hydroperoxide, ditertiary butyl peroxide, and cumene hydroperoxide, among many others. The ketone peroxides may also be used, i.e. the methyl ethyl ketone peroxide, the diethyl ketone peroxide and the like. The amounts of the catalytic material used will be conventional, such as between about 0.01% and 10% and more, usually between about 0.1% and 3%, by weight, based on the total weight of the polymerizable composition.

The coated plastic articles produced according to the process of the present invention have a plurality of designed end uses such as transparent panels to be used as windowpanes, television implosion shields, optical lenses such as those used in eyeglasses, including sunglasses, binoculars, telescopes and the like. If desired, the polyester resin compositions coated on the polymer substrate may have incorporated therein, ultraviolet light absorbers of which a substantial plurality are well known in the art. A significant number of these ultraviolet absorbers are disclosed in the Day et al. U.S. Patent 2,777,828. The amounts used are now conventional and are set forth in the aforementioned reference. If desired, particularly for show-window purposes and sunglasses, photochromic materials may also be incorporated into the polyester which is coated on the substrates, thereby permitting changes from a colored object to a clear object and vice versa, due to the absence or presence of light, including sunlight. If a permanent coloration is desired certain dyes and/or pigments may be dissolved in the unsaturated polymerizable polyester resin in order to achieve a tinting before coating on the polymer base.

The following examples are set forth for purposes of illustration only and are not to be construed as limitations on the present invention except as set forth in the appended claims. All parts and percentages are by weight unless otherwise indicated.

EXAMPLE 1

A cast sheet of poly(methyl methacrylate) is coated with a solution of 25 parts of poly(vinyl butyral) in 260 parts of 95% ethanol, 225 parts of toluene and 100 parts of n-butanol for about 5 minutes. The sheet is then allowed to drain and is then dried for 10 minutes at 40° C. to evaporate off the ethanol, toluene and butanol. Thereafter, a polyester resin composition comprising 80 parts of triethylene glycol fumarate (50/50) and 20 parts of ethylene glycol dimethacrylate, catalyzed with a mixture of 0.03% cobalt (as the naphthenate), 0.036% calcium (as the naphthenate), 1.0% methyl ethyl ketone hydroperoxide in dimethyl phthalate and 0.25% of benzoyl peroxide, is poured onto the poly(vinyl butyral)-treated poly(methyl methacrylate) sheet. The resulting coated sheet is placed between two layers of plate glass and clamped together to form a unitary structure. The entire assembly is held at 70° C. for 16 hrs. and then at 100° C. for 1½ hrs. Upon cooling, the glass plates are removed and the surface of the resultant sheet is tested for mar-resistance and bond strength. The mar-resistance is evaluated as 2 using a mar-tester, the bond is excellent, as measured by the Scotch tape grid test, and the haze is 0.7%. The mar-resistance of an uncoated sheet of poly(methyl methacrylate) using the same mar-tester is 30. A rating of 1–5 is very good while a rating of over 16 is poor. All of the polyester mar-resistant coating is removed by the Scotch tape grid test when a coating is applied to a poly(methyl methacrylate) sheet which is not pretreated with poly(vinyl butyral).

The Scotch tape grid test is accomplished by scratching the finished surface through, with a sharp point in a series of parallel lines about 1/16" apart. A piece of No. 600 Scotch brand cellophane tape is firmly pressed into contact with the coated surface so as to cover the scratched lines. When the tape is pulled off quickly, no peeling of the coated surface will be observed if the bonding is excellent. Slight removal of the finish at the edges of the scratches is permissible without effecting the bonding.

EXAMPLE 2

Example 1 is repeated in substantially all details except that the mar-resistant polyester resin composition which is coated on the polymer sheet contains, additionally, about 3 parts of monomeric styrene. The mar-resistance of the resultant coated article is 1 and the bonding is excellent, as measured by the Scotch tape grid test. The haze value on the finished product is 0.2%. When a sheet of poly(methyl methacrylate), coated with the same polyester resin but not coated with poly(vinyl butyral) is tested with the Scotch tape grid test, all the polyester coating is removed.

Following the procedure of Example 1, various other polyester compositions, base polymers, and vinyl butyral polymers were utilized according to the instant invention. The results are set forth in Table 1, hereinbelow.

TABLE I

| Ex. | Polyester composition, parts | Base polymer | Vinyl butyral polymer | Mar-resistance | Grid test |
| --- | --- | --- | --- | --- | --- |
| 3 | Sec., sec. isomer of dipropylene glycol fumarate, 80; diethylene-glycol diacrylate, 20; styrene, 10. | Poly(vinyl chloride) | Vinyl butyral polymer containing 17.5% vinyl alcohol and 2.5% vinyl acetate units. | 2 | Passed, no coating removed. |
| 4 | Triethylene glycol fumarate, 296; ethyl acrylate, 60; allyl methacrylate, 24; triallyl cyanurate, 20. | Poly(methyl methacrylate) | Poly(vinyl butyrate) | 3 | Do. |
| 5 | Triethylene glycol/2-ethyl-1,3-hexanediol/fumaric acid (1/b), 100; diethylene glycol diacrylate, 25; styrene, 5. | Poly(styrene) | Same as Ex. 3 | 4 | Do. |
| 6 | Tetrapropylene glycol fumarate, 80; triethylene glycol dimethacrylate, 10; allyl methacrylate, 10. | Poly(carbonate)[1] | do | 3 | Do. |

[1] Reaction product of Bisphenol A and phosgene.

What is claimed is:

1. A process for improving the mar-resistance of a rigid plastic sheet and also improving the bonding of the surface layer to said sheet comprising contacting a rigid plastic sheet selected from the group consisting of polyacrylates, polystyrenes, polyvinyl halides, polyvinyl acetates and polycarbonates with a vinyl butyral polymer solution, evaporating off the solvent, coating the thus treated sheet with a substantially linear, water-insoluble, non-gelled, unsaturated polyester resin composition comprising a blend of (1) the esterification reaction product of fumaric acid and a glycol selected from the group consisting of polyethylene glycol and polypropylene glycol wherein said glycol has between 6 and 39 carbon atoms, said esterification reaction product having an acid number below about 35 and (2) from about 10% to about 40%, by weight, based on the total weight of (1) and (2), of at least one copolymerizable monomer and curing said polyester resin.

2. A process according to claim 1 wherein said copolymerizable monomer is a glycol diacrylate which is the reaction product of a glycol selected from the group consisting of polyglycols having from 4 to 8 carbon atoms, inclusive, and monoglycols having from 2 to 4 carbon atoms, inclusive, and an acid selected from the group consisting of acrylic acid and methacrylic acid.

3. A process according to claim 1 wherein said plastic sheet is poly(methyl methacrylate).

4. A process for improving the mar-resistance of a rigid plastic sheet and also improving the bonding of the surface layer to said sheet comprising contacting a rigid plastic sheet of a polymer selected from the group consisting of polyacrylates, polystyrenes, polyvinyl halides, polyvinyl acetates and polycarbonates with a vinyl butyral polymer solution, evaporating off the solvent, coating the thus treated sheet with a substantially linear, water-insoluble, non-gelled, unsaturated polyester resin composition comprising a blend of (1) the esterification reaction product of fumaric acid and a glycol selected from the group consisting of a polyethylene glycol and a polypropylene glycol, wherein said glycol has between 6 and 39 carbon atoms and wherein said product has an acid number below about 35, (2) a glycol diacrylate which is the reaction product of a glycol selected from the group consisting of polyglycols having from 4 to 8 carbon atoms and monoglycols containing from 2 to 4 carbon atoms, inclusive, and an acid selected from the group consisting of acrylic acid and methacrylic acid wherein (2) is present in an amount varying between about 10% and 40%, by weight, based on the total weight of (1) and (2), and (3) a polymerizable styrene, in an amount varying between about 1% and 5%, by weight, based on the total weight of (1), (2) and (3) and curing said polyester resin.

5. A process for improving the mar-resistance of a rigid plastic sheet and also improving the bonding of the surface layer to said sheet comprising contacting a rigid plastic sheet of a polymer selected from the group consisting of polyacrylates, polystyrenes, polyvinyl halides, polyvinyl acetates and polycarbonates with a vinyl butyral polymer solution, evaporating off the solvent, coating the thus treated sheet with a substantially linear, water-insoluble, non-gelled, unsaturated polyester resin composition comprising a blend of (1) the esterification reaction product of fumaric acid and triethylene glycol, said product having an acid number below about 35 and (2) ethylene glycol dimethacrylate wherein (2) is present in an amount varying between about 10% and 40%, by weight, based on the total weight of (1) and (2) and curing said polyester resin.

6. A rigid, plastic body having a mar-resistant surface comprising a rigid plastic base sheet of a polymer selected from the group consisting of polyacrylates, polystyrenes, polyvinyl halides, polyvinyl acetates and polycarbonates having a coating on at least one surface thereof of a binding agent comprising a polymer of vinyl butyral, and super-imposed on said binding agent layer, a cured layer of a hard, mar-resistant, cross-linked unsaturated polyester resin composition comprising the reaction product of (1) the esterification reaction product of reactants consisting essentially of fumaric acid and a glycol selected from the group consisting of polyethylene glycol and polypropylene glycol said esterification reaction product having an acid number below about 35 and (2) a glycol diacrylate which is the reaction product of a glycol selected from the group consisting of polyglycols having from 4 to 8 carbon atoms and monoglycols containing from 2 to 4 carbon atoms, inclusive, and an acid selected from the group consisting of acrylic acid and methacrylic acid wherein (2) is present in an amount varying between about 10% and 40%, by weight, based on the total weight of (1) and (2).

7. A rigid, plastic body according to claim 6 wherein said plastic sheet is poly(methyl methacrylate).

8. A rigid, plastic body having a mar-resistant surface comprising a rigid plastic base sheet of a polymer selected from the group consisting of polyacrylates, polystyrenes, polyvinyl halides, polyvinyl acetates and polycarbonates having a coating on at least one surface thereof of a binding agent comprising a polymer of vinyl butyral, and super-imposed on said binding agent layer, a cured layer of a hard, mar-resistant, cross-linked unsaturated polyester resin composition comprising the reaction product of (1) the esterification reaction product of reactants consisting essentially of fumaric acid and a polyethylene glycol, said esterification reaction product having an acid number below about 35 and (2) a glycol diacrylate which is the reaction product of a glycol selected from the group consisting of polyglycols having from 4 to 8 carbon atoms and monoglycols containing from 2 to 4 carbon atoms, inclusive, and an acid selected from the group consisting of acrylic acid and methacrylic acid wherein (2) is present in an amount varying between about 10% and 40%, by weight, based on the total weight of (1) and (2).

9. A rigid, plastic body having a mar-resistant surface comprising a rigid plastic base sheet of a polymer selected from the group consisting of polyacrylates, polystyrenes, polyvinyl halides, polyvinyl acetates and polycarbonates having a coating on at least one surface thereof of a binding agent comprising a polymer of vinyl butyral, and super-imposed on said binding agent layer, a cured layer of a hard, mar-resistant, cross-linked unsaturated polyester resin composition comprising the reaction product of (1) the esterification reaction product of reactants consisting essentially of fumaric acid and a polypropylene glycol, wherein said esterification reaction product has an acid number below about 35, and (2) a glycol diacrylate which in the reaction product of a glycol selected from the group consisting of polyglycols having from 4 to 8 carbon atoms and monoglycols containing from 2 to 4 carbon atoms, inclusive, and an acid selected from the group consisting of acrylic acid and methacrylic acid, wherein (2) is present in and amount varying between about 10% and 40%, by weight, based on the total weight of (1) and (2).

10. A rigid plastic body having a mar-resistant surface comprising a rigid plastic base sheet of a polymer selected from the group consisting of polyacrylates, polystyrenes, polyvinyl halides, polyvinyl acetates and polycarbonates having a coating on at least one surface thereof of a binding agent comprising a polymer of vinyl butyrate, and super-imposed on said binding agent layer, a cured layer of a hard, mar-resistant, cross-linked unsaturated polyester resin composition comprising the reaction product of (1) the esterification reaction product of reactants consisting essentially of fumaric acid and a glycol selected from the group consisting of polyethylene glycol and polypropylene glycol, wherein said esterification reaction product has an acid number below about 35, (2) a glycol diacrylate which is the reaction product of a glycol selected from the group consisting of polyglycols having from 4 to 8 carbon atoms and monoglycols containing from 2 to 4 carbon atoms, inclusive, and an acid selected from the group consisting of acrylic and methacrylic acid, wherein (2) is present in an amount varying between about 10% and 40%, by weight, based on the total weight of (1) and (2), and (3) a polymerizable styrene in an amount varying between about 1% and 5% by weight based on the total weight of (1), (2) and (3).

11. A rigid, plastic body having a mar-resistant surface comprising a rigid plastic base sheet of a polymer selected from the group consisting of polyacrylates, polystyrenes, polyvinyl halides, polyvinyl acetates and polycarbonates having a coating on at least one surface thereof of a binding agent comprising a polymer of vinyl butyral, and super-imposed on said binding agent layer, a cured layer of a hard, mar-resistant, cross-linked unsaturated polyester resin composition comprising the reaction product of (1) the esterification reaction product of fumaric acid and a glycol selected from the group consisting of a polyethylene glycol and a polypropylene glycol wherein said glycol has between 6 and 39 carbon atoms, said esterification reaction product having an acid number below about 35 and (2) from about 10% to about 40%, by weight, based on the total weight of (1) and (2), of at least one monomer copolymerizable therewith.

References Cited

UNITED STATES PATENTS

| | | | |
|---|---|---|---|
| 2,440,711 | 5/1948 | Bechtold | 117—161 |
| 2,998,324 | 8/1961 | Hirt | 117—76 X |
| 3,264,372 | 8/1966 | Deichert et al. | |
| 3,304,196 | 2/1967 | Deichert et al. | 117—76 |

WILLIAM D. MARTIN, *Primary Examiner.*

R. HUSACK, *Assistant Examiner.*

U.S. Cl. X.R.

117—138.8, 161, 33.3